United States Patent Office 2,872,296
Patented Feb. 3, 1959

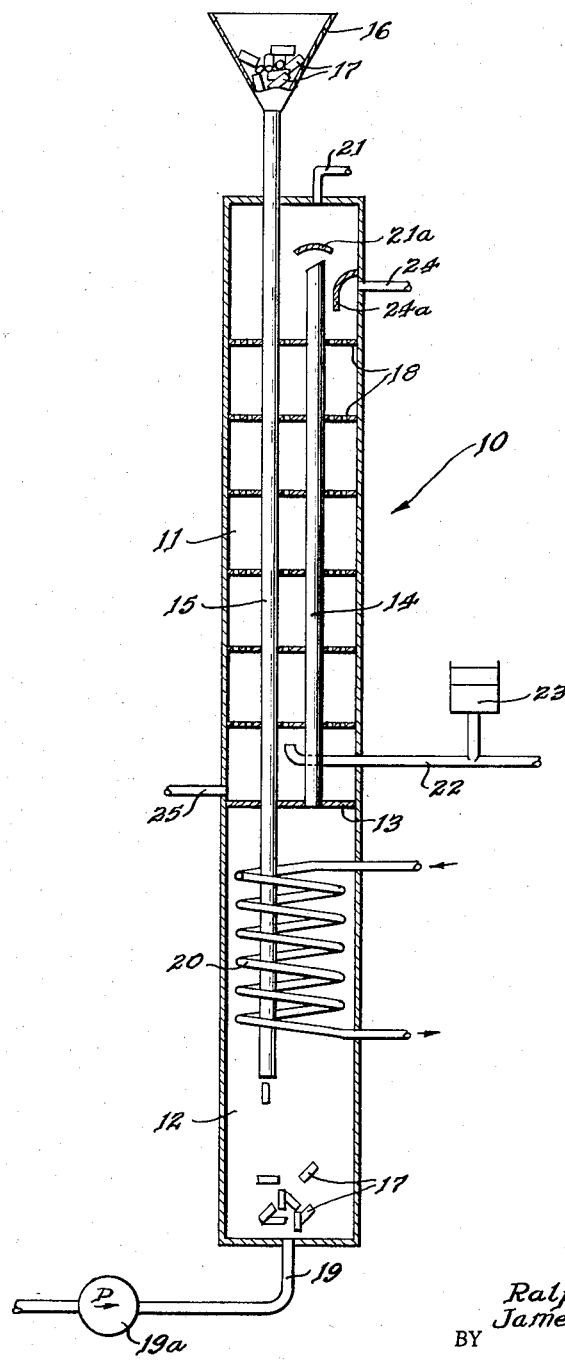

2,872,296

CONTINUOUS DISSOLVER EXTRACTOR FOR PROCESSING METAL

Ralph B. Lemon and James A. Buckham, Idaho Falls, Idaho, assignors to the United States of America as represented by the United States Atomic Energy Commission Application March 26, 1957, Serial No. 648,754

4 Claims. (Cl. 23—283)

This invention relates to an apparatus for the continuous dissolution of metal and for the continuous extraction of certain constituents thereof. More particularly, the invention pertains to an apparatus in which the continuous dissolution of metal slugs may be performed to achieve an output of uniform composition which may be continuously supplied to a solvent extractor wherein certain constituents of the metal may be removed and further processed if desired.

Prior to this invention, the dissolution of metal slugs composed of several metals to be later separated by solvent extraction means has been performed by batch processing. For example, neutronic reactor fuels are periodically processed to separate the fissionable material from alloying elements and from fission products which may "poison" the reactor if they are not removed. Many neutronic reactors use uranium-aluminum alloy fuel elements of various compositions and shapes; these spent fuels in the past have required processing by batchwise, mercury-catalyzed, dissolution in nitric acid followed by separation of uranium from aluminum and fission products by solvent extraction. Batch processing has been mandatory since efficient separation by solvent extraction requires that the feed solution be of uniform composition. In producing an output solution of uniform composition which may be fed to a solvent extractor, continuous dissolvers have heretofore been unsatisfactory, since control and stabilization of the variables inherent in continuous dissolvers has been most difficult. Several such variables are metal feed rate, acid feed rate, metal dissolution rate, and most important, dissolver output composition.

In the batch processing of slugs composed of several metals, all that is required to achieve an end product of a specified composition is to combine a specified weight of metal with a specified amount of acid of given concentration in a reaction vessel and to permit the reaction to go to completion. Thus, in a batch process, little concern is warranted regarding variations in the dissolution rate of the metal, for the resultant solution will always be of the same composition if the reactants for each batch are combined in the same proportions. However, the batch process, although consistently yielding an end product of desired composition, is slow, intermittent, and expensive to employ, especially when large quantities of materials have to be processed. To accelerate the processing of metal slugs and to provide means whereby a continuous feed solution of uniform composition is made available to a solvent extractor employed in such processing, a continuous dissolving of the metal slugs is more advantageous. Such a scheme is particularly feasible economically when repeatedly large quantities of metal have to be processed. However, with continuous dissolution techniques of the past, it has been extremely difficult to produce a continuous output of substantially uniform composition, and for this reason continuous dissolvers have been limited to applications which were not restricted by this requirement.

It is an object therefore of this invention to provide an apparatus in which the continuous dissolution of metal may be accomplished to produce an output of substantially uniform composition.

Another object of this invention is to provide an apparatus in which slugs composed of several different metals may be dissolved and various constituents of the slugs separated in a continuous manner.

Other objects of this invention will become apparent from the following detailed description and the single figure of the drawing which is a vertical sectional view of the apparatus.

The apparatus of the present invention includes a long tank 10 divided into an upper extracting section 11 and a lower dissolving section 12 by a plate 13. Plate 13 is disposed within the tank 10 transversely to the axis thereof and is joined to the inner wall of the tank by welding or other means to prevent communication between the sections 11 and 12, except as provided by a conduit 14. Conduit 14 at the lower end thereof is joined to the plate 13 at a hole therein and extends upwardly into the extracting section 11, the conduit terminating in an open end a short distance from the top of the tank 10. A duct 15, open at both ends and having a lower end disposed within the dissolving section 12, passes through the plate 13 and the top of the tank 10 and is connected to a hopper 16 located above the tank and containing metal slugs 17. A plurality of spaced parallel perforated disks or baffles 18 is disposed within the extracting section 11 transversely to the axis of the tank 10 and is welded to the interior thereof. The conduit 14 and duct 15 pass through the baffles 18.

In the operation of the apparatus, metal slugs 17 are permitted to pass at a constant rate with time into the dissolving section 12 through the duct 15 from the hopper 16. Acid, whose feed rate may be varied, and catalyst are made to enter the dissolving section 12 through an acid inlet 19 located at the bottom of the tank 10 under the pressure of an acid pump 19a connected between the acid inlet and a source of acid, not shown. The acid flows upwardly through the dissolving section 12 passing over the metal slugs 17 to dissolve and carry away their constituents. A heat exchanger 20 is provided in the dissolving section 12 to remove heat generated by the dissolution of the metal slugs 17 and to prevent an excessive generation of steam and other vapors. The solution resulting from the reaction of the acid and the slugs leaves the top of the dissolving section 12 via the conduit 14 and overflows at the upper end of the conduit into the extracting section 11. Any gases in the solution escape from the tank 10 through a gas outlet 21 connected to the top of the tank. A source of vacuum, not shown, is connected to the gas outlet 21 to encourage the release of occluded and dissolved gases from the solution overflowing from conduit 14 into the extracting section 11. In addition to this function, the source of vacuum also serves to reduce the vapor pressure on acid issuing from conduit 14, and thus a lower pressure is required at the acid inlet 19 to achieve a given flow rate of acid through the dissolving section 12. An imperforate deflector 21a located between the gas outlet 21 and the upper end of the conduit 14, prevents the solution from surging out of the conduit 14 into the gas outlet 21. The solution passes down through the perforated disks 18 under gravity upon issuing from conduit 14. An organic solvent is made to enter the bottom of the extracting section 11 under pressure through a solvent inlet 22 located adjacent to the plate 13. The solvent is forced intermittently through the perforated disks 18 countercurrently to the solution by a pulse generator 23 which is connected between the solvent inlet 22 and a source of solvent, not shown. Because of the counterflow of the solution and the organic solvent, there is an intimate intermingling of the two liquids in the extracting section 11. This intermingling causes the extraction of certain metallic values from the solution by the organic solvent. The organic solvent and the extracted metallic values are withdrawn from the top of the extracting section 11 through a solvent outlet 24 to be further processed for the recovery of the extracted metallic values contained therein. An imperforate baffle 24a, extending down from the top of the outlet 24, prevents solution overflowing from the conduit 14 from exiting through the solvent outlet 24. The solution minus the said metallic values exits under gravity from the extracting section 11 through a solution outlet 25 near the bottom thereof. Since some of the metallic values that it was desired to extract still remain in the solution because of a somewhat less than complete extraction, the solution exiting from solution outlet 25 may be subjected to one or more additional solvent extractions in auxiliary apparatus, not shown.

Initially, the dissolving section 12 is charged with an equilibrium number of metal slugs 17, i. e., that number of slugs which will provide a metal dissolution rate equal to the metal feed rate from the hopper 16 for a constant flow rate of acid of given concentration. For example, if 1.0 metal slug 17 per minute is released by the hopper 16 and transferred to the dissolving section 12 through the duct 15 while the average dissolution rate per metal slug in the dissolving section 12 is 0.1 slug per minute, then the equilibrium number of slugs would be 10.0. With such conditions prevailing, the number of slugs in the dissolving section 12 would remain constant, as would the concentration of metallic values in the acid entering the extracting section 11 for given metal and acid feed rates to the dissolving section. For a constant rate of solvent flow through the extracting section 11 then, the concentration of metallic values in solvent leaving the tank 10 at solvent outlet 24 will remain constant. However, slight fluctuations in the parameters affecting dissolution of the metal slugs 17 are inevitable in practice. Changes in temperature, fluid turbulence, accessibility of metal to acid, flow rate, and other factors will cause increased or decreased dissolution rates to take place from time to time. Unless some compensation is made for these variations, the composition of the acid and metallic product being supplied to the extracting section 11 will vary and accordingly the metallic content of the organic solvent exiting at solvent outlet 24 will vary. In the apparatus of the present invention, self-regulation prevents any such variations from occurring. This is accomplished through the novel apparatus of the present invention including the hopper 16 which transfers metal slugs 17 to the dissolving section 12 at a constant rate. If the dissolution rate per metal slug 17 in the dissolving section 12 decreases, there will be an increase in metal slug area exposed to acid flow, for metal slugs 17 are being added at a rate greater than that at which they are being dissolved. The result is that the metallic product concentration in the acid entering the extracting section 11 will not vary although the dissolution rate per metal slug has decreased in the dissolving section 12. Conversely, should the dissolution rate per metal slug 17 in the dissolving section 12 increase, there will be a decrease in metal slug area exposed to acid flow for metal slugs are being added at a rate less than that at which they are being dissolved. The result is that the metallic product concentration in the acid entering the extracting section 11 will not vary although the dissolution rate per metal slug 17 has increased in the dissolving section 12. An inherently stable system is thus attained by the apparatus of the present invention.

It has been discovered in the development of the present invention that the dissolution rate of metal slugs 17 in the dissolving section 12 is accelerated for a given acid feed rate by the addition of mercuric ion to the acid. Mercuric nitrate was added to the acid in varying concentration while holding all other input parameters constant but permitting the output composition to vary. Up to a limiting concentration of mercuric ion in acid, the dissolution rate was found to increase approximately with the cube root of mercuric ion concentration. Two types of metal slugs 17 were employed, cast and extruded. Beyond a 0.015 M concentration of mercuric ion, no increase in the dissolution rate of the cast slugs took place, whereas 0.005 M was the limiting concentration for the extruded slugs. The nature of this action is not certain, but it is believed that free mercury is plated out on the slugs and that certain constituents are thereby amalgamated. Amalgamation of certain constituents of the metal slugs 17 would cause an effective increase in the quantity of metal exposed to acid by causing an increase in the disintegration rate of the slugs. Variations in mercuric ion concentration in the acid feed were also made while varying other input parameters to maintain a dissolver output of constant composition. The results of these tests showed that the dissolution rate varied in direct proportion to the 1.65 power of the mercuric ion concentration in the acid feed. Since under ordinary operating conditions a dissolver output of uniform composition is to be maintained, the dissolution rate of metal slugs 17 may be expected to increase in direct proportion to the 1.65 power of the mercuric ion concentration, if other parameters such as acid feed rate are adjusted to keep the dissolver output of uniform composition. This is noteworthy since, as previously mentioned, when all parameters other than mercuric ion concentration are held constant and the dissolver output composition is allowed to vary with mercuric ion concentration, the dissolution rate of metal slugs 17 increases in direct proportion to the cube root of the mercuric ion concentration.

Experiments were also performed in the apparatus of the present invention to determine the effect of acid feed rate in gram-moles per hour on the dissolution rate. It was found that the dissolution rate varies approximately in direct proportion to the 0.8 power of acid feed rate, all other input parameters being held constant while the output composition was permitted to vary. This increased dissolution rate caused by an increased acid feed rate is probably due to the fact that expended acid is more quickly swept away from the surface of the metal slugs 17, in addition to the fact that the metal is exposed to a greater number of hydrogen ions in a given time.

The effect of variations in the concentration of the feed acid upon the dissolution rate for a given acid feed rate was also investigated in an attempt to determine the optimum concentration for maximizing the dissolution rate. Tests were made on both cast and extruded metal slugs 17 employing nitric acid. For cast slugs the maximum dissolution rate per slug per mole of acid occurred with acid of about 3.0 molar concentration, while the optimum concentration for extruded slugs occurred with acid of about 5.0 molar concentration. This fact indicates that the fabrication history of the metal being dissolved will determine the optimum concentration of acid to be employed in maximizing the dissolution rate.

The results achieved in the operation of the apparatus of the instant invention were all achieved employing sample aluminum slugs 17 having a diameter of 1.5 inches and a length of 8.0 inches. The results achieved employing pure aluminum slugs may be extended to the dissolution of uranium-aluminum slugs, since experiments have shown that slugs having the uranium-aluminum-fission product composition normally found in neutronic reactors dissolve slightly more rapidly than do pure aluminum slugs, everything else being equal.

It is obvious that the apparatus of the present invention may be employed in the dissolution and separation of metals other than aluminum alloys and that the invention is not to be limited to such applications. Modifications of the apparatus of the present invention will become apparent to those skilled in the art and hence the invention is to be limited only by the scope of the appended claims.

What is claimed is:

1. An apparatus for continuously dissolving metal slugs in acid and extracting certain constituents therefrom with an organic solvent, said apparatus comprising a tank divided into a dissolving section having an upper and a lower end and an extracting section having perforated baffles and an upper and a lower end, a duct for slugs entering the tank through the upper end of the extracting section and leading to the dissolving section, an inlet for acid at the lower end of the dissolving section, a conduit for solution leading from the dissolving section into the extracting section and terminating in an open end within the upper end of the extracting section, an outlet for solution at the lower end of the extracting section adjacent to the dissolving section, means for pulsing organic solvent into the extracting section at said lower end, and an outlet for organic solvent and metallic values extracted thereby at the upper end of the extracting section.

2. An apparatus for the continuous dissolution of metal slugs and for the continuous separation of the constituents thereof, said apparatus comprising a tank, a plate disposed within and joined to the tank and dividing the tank into a first and a second section, said plate being provided with a first and a second hole, a conduit joined at one end to the plate at the first hole and extending into the second section, a duct joined to the plate and passing therethrough at the second hole, said duct passing from the first section through the second section to a region outside of the tank, a heat exchanger disposed within the first section, a plurality of perforated disks disposed within the second section, an inlet for acid connected to the first section, a pump connected to the inlet for acid, an outlet for solution connected to the second section, an inlet for organic solvent connected to the second section, pulsing means connected to the inlet for organic solvent, and an outlet for organic solvent connected to the second section.

3. An apparatus for continuously dissolving metal and extracting certain constituents therefrom, said apparatus comprising a vertically disposed cylindrical tank, a plate provided with a first and a second hole and horizontally disposed within and dividing the tank into an upper and a lower section, a conduit joined at one end to the plate at the first hole and extending vertically upwardly into the upper section to a height less than the top of the tank, a duct joined to the plate and passing therethrough at the second hole, the duct extending vertically downwardly from the plate into the lower section and extending vertically upwardly from the plate through the upper section to a height greater than the top of the tank, a hopper connected to the end of the duct above the tank, a heat exchanger disposed within the lower section adjacent to the plate, a plurality of perforated disks horizontally disposed within the upper section transversely to the duct and conduit, an inlet for acid connected to the lower section, a pump connected to the inlet for acid, an outlet for solution connected to the upper section adjacent to the plate, an inlet for solvent connected to the upper section adjacent to the plate, pulsing means connected to the inlet for solvent for forcing solvent upwardly through the perforated disks in the upper section and counter-currently to solution passing downwardly through the perforated disks, and an outlet for solvent connected to the upper section.

4. An apparatus for the continuous dissolution of metal and for the continuous extraction of certain constituents therefrom, said apparatus comprising a tank, a plate disposed within and dividing the tank into a first and a second section, a duct for metal connecting the first section with a region outside of the tank, a conduit for solution connecting the first section with the second section, a heat exchanger disposed within the first section, a plurality of perforated baffles disposed within the second section, an inlet for acid connected to the first section, a pump connected to the inlet for acid, an outlet for solution connected to the second section, an outlet for solvent connected to the second section, and means for pulsing solvent and acid countercurrently to one another in the second section.

References Cited in the file of this patent

UNITED STATES PATENTS 2,282,265     Swallen et al. _____ May 5, 1942